(12) United States Patent
Tong et al.

(10) Patent No.: US 10,778,479 B1
(45) Date of Patent: Sep. 15, 2020

(54) SYSTEMS AND METHODS FOR WIRELESS TRANSMISSION OF AUDIO INFORMATION

(71) Applicant: BESTECHNIC (SHANGHAI) CO., LTD., Shanghai (CN)

(72) Inventors: Weifeng Tong, Shanghai (CN); Chunjiang Tu, Shanghai (CN); Liang Zhang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/877,432

(22) Filed: May 18, 2020

Related U.S. Application Data

(63) Continuation of application No. PCT/CN2020/089933, filed on May 13, 2020.

(30) Foreign Application Priority Data

Apr. 27, 2020 (CN) .......................... 2020 1 0341287

(51) Int. Cl.
| | | |
|---|---|---|
| H04L 25/06 | (2006.01) | |
| H04L 25/03 | (2006.01) | |
| H04B 17/336 | (2015.01) | |
| H04L 1/00 | (2006.01) | |
| H04L 1/20 | (2006.01) | |

(52) U.S. Cl.
CPC ......... H04L 25/067 (2013.01); H04B 17/336 (2015.01); H04L 1/005 (2013.01); H04L 1/0054 (2013.01); H04L 1/20 (2013.01); H04L 25/03299 (2013.01); H04L 25/03318 (2013.01)

(58) Field of Classification Search
CPC .. H04B 17/309; H04B 17/318; H04B 17/336; H04L 1/005; H04L 1/0054; H04L 1/0083; H04L 1/0084; H04L 1/20; H04L 25/0202; H04L 25/0224; H04L 25/0226; H04L 25/0228; H04L 25/03299; H04L 25/03318; H04L 25/03993; H04L 25/061; H04L 25/067; H04L 27/06; H04L 27/14
USPC ............... 375/225, 227, 262, 324, 340, 341; 370/332, 333, 337, 347, 349; 329/341–343, 369, 371; 381/370, 380, 381/381; 455/226.1, 266.2, 266.3
See application file for complete search history.

(56) References Cited

U.S. PATENT DOCUMENTS

| | | | | |
|---|---|---|---|---|
| 6,671,340 B1 * | 12/2003 | Kroeger | ................. | H04H 20/30 370/487 |
| 6,980,602 B1 * | 12/2005 | Kleinerman | .......... | H04L 1/0047 327/1 |
| 8,442,167 B2 * | 5/2013 | Myong, II | .......... | H04L 27/0014 375/346 |
| 8,593,570 B2 * | 11/2013 | Boland | .............. | H04N 21/4147 348/376 |

(Continued)

*Primary Examiner* — Young T. Tse
(74) *Attorney, Agent, or Firm* — Bayes PLLC

(57) ABSTRACT

Embodiments of systems and methods for wireless communication are disclosed. The method includes receiving a first payload, corresponding to original data, and demodulating a first payload estimation based on making a first soft decision of the first payload. The method also includes demodulating a second payload estimation based on making a second soft decision of the second payload and determining a first consolidated payload estimation based on consolidating the first payload estimation and the second payload estimation.

20 Claims, 8 Drawing Sheets

(56) References Cited

U.S. PATENT DOCUMENTS

| | | | | |
|---|---|---|---|---|
| 8,868,222 B2* | 10/2014 | Egi | ............ | G10L 25/69 |
| | | | | 700/94 |
| 9,973,225 B1* | 5/2018 | Jalloul | ............ | H04B 1/1027 |
| 10,244,307 B1* | 3/2019 | Tong | ............ | H04L 1/1867 |
| 2002/0193072 A1* | 12/2002 | Alinikula | ............ | H04L 1/1664 |
| | | | | 455/41.1 |
| 2008/0125037 A1* | 5/2008 | Ibrahim | ............ | H04W 4/18 |
| | | | | 455/41.2 |
| 2011/0019599 A1* | 1/2011 | Wood | ............ | H04L 1/1858 |
| | | | | 370/310 |
| 2015/0264627 A1* | 9/2015 | Perdomo | ............ | H04L 67/18 |
| | | | | 370/329 |
| 2020/0011701 A1* | 1/2020 | Castang | ............ | G01C 9/005 |

* cited by examiner

SYSTEMS AND METHODS FOR WIRELESS TRANSMISSION OF AUDIO INFORMATION

CROSS-REFERENCE TO RELATED APPLICATIONS

This application is continuation of International Application No. PCT/CN2020/089933, filed on May 13, 2020, entitled "SYSTEMS AND METHODS FOR WIRELESS TRANSMISSION OF AUDIO INFORMATION," which claims the benefit of priority to Chinese Patent Application No. 202010341287.X, filed on Apr. 27, 2020, both of which are incorporated herein by reference in their entireties.

BACKGROUND

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

True wireless stereo (TWS) headphones (also known as untethered headphones) is a type of wireless headphones that remove the wires between the left and right headphones. However, because of the limitations of the wireless communication technologies, error in wireless transmission of data (e.g., data packets) happens. When the audio information received include errors (i.e., not successfully received), audio sources will re-transmit the audio information for predetermined times or till it is correctly received. Upon receiving the data, conventional wireless headphones make hard decision decoding/demodulation on the data (e.g., take on a fixed set of possible values). This would lose information encoded in the transmitted data and reduce the accuracy of the demodulation. As a result, more times of re-transmission would be required and thus waste resources and time.

SUMMARY

Embodiments of systems and methods for wireless transmission of audio information are disclosed herein.

In one example, a method includes receiving a first payload, corresponding to original data and demodulating a first payload estimation based on making a first soft decision of the first payload. The method also includes demodulating a second payload estimation based on making a second soft decision of the second payload and determining a first consolidated payload estimation based on consolidating the first payload estimation and the second payload estimation.

In another example, a wireless audio transceiver includes a radio frequency module and a demodulation module. The radio frequency module is configured to receive a first and a second payload, corresponding to original data. The demodulation module is configured to demodulate a first payload estimation of the original data based on making a first soft decision of the first payload. The demodulation module is also configured to demodulate a second payload estimation of the original data based on making a second soft decision of the second payload and determine a first consolidated payload estimation of the original data based on consolidating the first payload estimation and the second payload estimation.

In still another example, a system for wireless communication includes a memory storing code and a demodulation module coupled to the memory. The demodulation module is configured to receive a first and a second payload, corresponding to original data and demodulate a first payload estimation of the original data based on making a first soft decision of the first payload. The demodulation module is also configured to demodulate a second payload estimation of the original data based on making a second soft decision of the second payload and determine a first consolidated payload estimation of the original data based on consolidating the first payload estimation and the second payload estimation.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
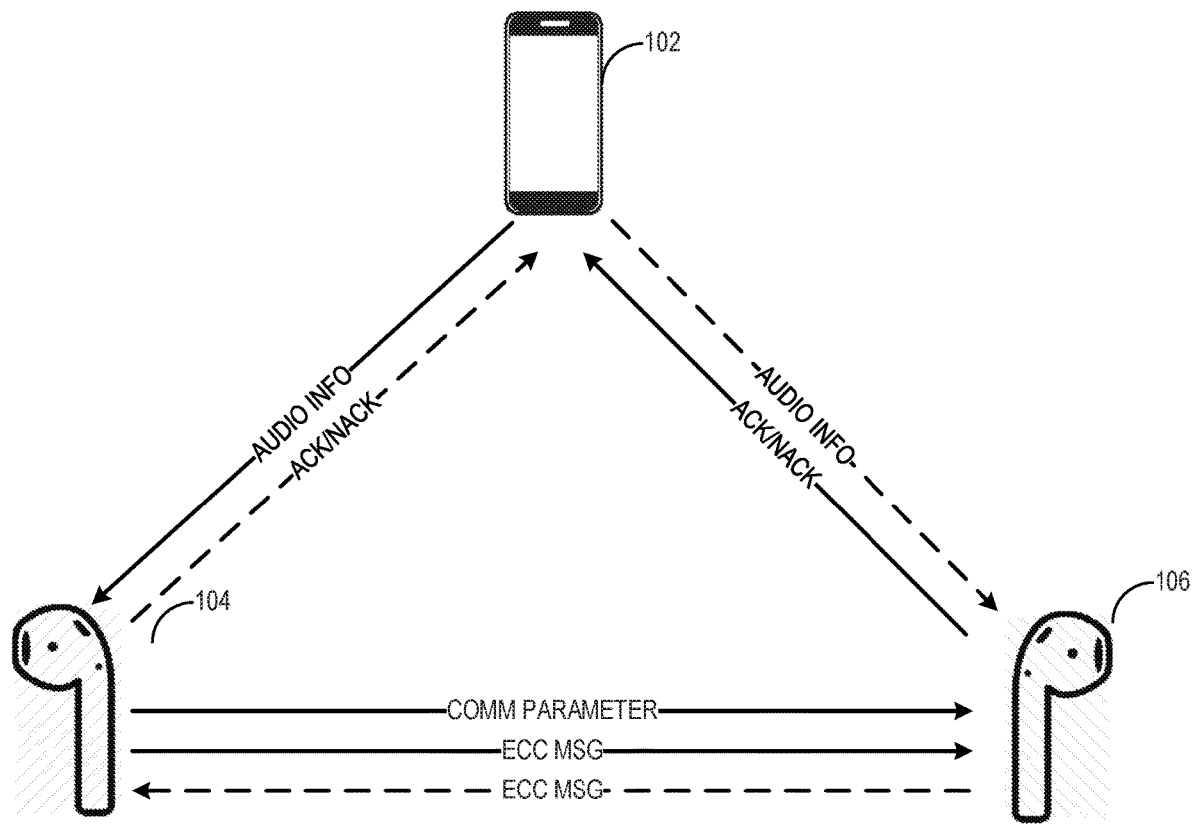
FIG. 1 is a block diagram illustrating an exemplary wireless audio system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is contemplated that such feature, structure, or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Wireless devices such as wireless headphones transmit information (e.g., audio information) based on wireless communication protocols such as BLUETOOTH protocols (e.g., BLUETOOTH classic), amended BLUETOOTH protocols (e.g., Low Energy (BLE), BLE audio, BLUETOOTH 5.2, etc.), Wi-Fi, Near-field Communication, etc. In some embodiments, audio information can be transmitted from an audio source to the wireless devices (e.g., a primary and a secondary wireless headphone) by coding the audio information into data packets (e.g., the original data) based on one of the wireless communication protocols. Upon receiving the data packets, the wireless device can demodulate the data packets and determine if the transmission is successful based on conducting a correction check such as CRC (cyclic redundancy check) check. When the received data fails to pass the correction check, a Negative Acknowledgement (NACK) is transmitted to the audio source and thus, the audio information is re-transmitted for predetermined times, or till it is received correctly (e.g., pass the correction check).

Conventional wireless devices demodulate the data packet based on hard decision decoding (e.g., making hard decisions on the received data packet). The result of the hard decision decoding is then used for checking if the data packet is received correctly. When the data packet is not correctly received, the same original data (e.g., the same audio information) will be re-transmitted, and the data packet re-transmitted each time would be independently checked for correctness. The data packets of unsuccessful transmission/re-transmission would be discarded. As a result, useful information (e.g., the correct part of the payload of the data packets) of each unsuccessfully transmitted/re-transmitted data packet is not utilized and thus be wasted.

As will be disclosed in detail below, among other novel features, the wireless communication system and method disclosed herein can make full use of the useful information of each data transmission/re-transmission. In some embodiments of the present disclosure, a wireless transceiver (e.g., the primary or the secondary wireless headphone) can demodulate the received data packet based on soft demodulating the data packet. When re-transmission happens, the wireless transceiver can keep as much useful information modulated on each data transmission/transmission as possible by consolidating a payload estimation (e.g., a de-whitened result of each soft decision) of each transmitted data packet. In some embodiments, a BLUETOOTH audio data packet includes an access code, a header, and a payload in which the actual audio information is coded. In some other embodiments (e.g., enhanced data packets), the data packet further includes guard, synchronization, and trailer fields. The payload estimation may be the estimation corresponding to the payload part of the BLUETOOTH data packet. Accordingly, the system and method disclosed herein can increase the accuracy of the demodulation and thus reduce the re-transmission times.

In some embodiments, to further increase the accuracy of the demodulation, when consolidating the payload estimations, the wireless transceiver may weight each payload estimation based on the quality of the payload estimation. For example, when performing the consolidation, the payload estimation with higher quality may be assigned with a heavier weight and vice versa. In some embodiments, the quality of the payload estimation may be determined based on smoothing a square of the result of the first soft decision corresponding to the payload estimation, smoothing a square of a difference between the result of the soft decision and a result of a corresponding hard decision, the signal-to-noise ratio of the received data packet, or any suitable criteria for determining the quality of the payload.

In some embodiments, to save the memory space of the wireless transceiver, only the latest determined consolidated payload estimation is kept (e.g., stored in a memory) for further processing (e.g., consolidate with another re-transmitted data packets if failed to pass the correction check and used for performing the correction check). The other payload estimations may be released from the memory. Accordingly, the wireless transceiver can consider all useful information of each data packets transmitted/re-transmitted, while save the memory space of the wireless transceiver by releasing the payload estimation(s) that has been used (e.g., being incorporated by consolidation).

In some embodiments, the wireless transceiver may also perform demodulation to the consolidated payload estimation before performing the correction check. To improve the overall instruction throughput (e.g., rate of successful message delivery), the wireless transceiver may pipelining process the core steps in the data packet demodulation process. For example, core instructions such as receiving payload(s) (e.g., receiving transmitted and/or re-transmitted data packets), consolidating payload estimations (e.g., consolidate payload estimation of unsuccessful transmission with payload estimation of the re-transmitted data packets), soft demodulating the consolidated payload estimation, etc., are orderly processed where the instructions are overlapped during execution. For example, the instruction pipeline may receive the stored payload estimation from the memory while previous instruction(s) are being executed in other segments of the system. Thus, multiple core instructions can be executed simultaneously and therefore increase communication efficiency. The latency from receiving the transmitted and/or re-transmitted data packets to obtain the CRC of consolidated payload is also greatly reduced. It is contemplated that "instruction(s)" here means steps in the wireless communication method disclosed herein and are not limited to processes performed by software. In some embodiments, part or all of the instructions mentioned above are performed on hardware(s) (e.g., the RF module, the demodulation module, timing module, etc.). The hardware will be disclosed in detail below.

In some embodiments, the wireless transceiver (e.g., an Error Correcting Code (ECC) transmitting wireless headphone) that successfully receives the data packets (e.g., the payload estimation passes the correction check) from the audio source would generate an error correcting message and transmit the error correcting message to the other wireless transceiver (e.g., an ECC receiving wireless headphone) for the ECC receiving wireless headphone to correct the data packet received from the audio source. In some embodiments, the error correcting message can include an ECC code without the payload corresponding to the audio information (e.g., the original data). This could reduce the length of the error correcting message. For example, the ECC transmitting wireless headphone may generate the ECC code based on encoding the payload of the data packets using Reed-Solomon (RS) codes, Bose-Chaudhuri-Hocquenghem (BCH) codes, or any other suitable error-correcting codes. The ECC receiving wireless headphone may transmit an ACK message to the audio source on condition that the ECC receiving wireless headphone successfully receives the data packets or correct the data packets based on the ECC code and the ECC transmitting wireless headphone successfully receives the data packets. Otherwise, the ECC receiving wireless headphone may transmit a NACK message to the audio source, and the audio source may start to re-transmit the same data packet.

In some embodiments, when the ECC transmitting wireless headphone successfully receives the data packets before re-transmission of the data packets, the ECC transmitting wireless headphone may continue generating error correcting messages based on each re-transmission. In some embodiments, each subsequent error correcting message may include different ECC codes. The ECC transmitting wireless headphone may still transmit each different error correcting message to the ECC receiving headphone for data packets correction. In some embodiments, if the subsequent re-transmission (e.g., after the ECC transmitting wireless headphone successfully receives the data packets in the first transmission) is unsuccessful, the ECC transmitting wireless headphone may determine if the data packet is received through re-transmission, based on the header of the data packet. Accordingly, the ECC transmitting wireless headphone can generate error correcting message(s) only based on the first transmission of the data packet.

In some other embodiments, if a subsequent re-transmission of the data packet to the ECC transmitting wireless headphone is unsuccessful, where at least one of previous data packet transmissions is successful, the ECC transmitting wireless headphone may generate the error correcting message based on the data packet successfully transmitted. Similarly, if the ECC receiving headphone unsuccessfully receives an error correcting message from the ECC transmitting wireless headphone, where at least one of previous error correcting message transmissions is successful, the ECC receiving headphone may use the successfully received error correcting message for data correction.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 is a block diagram illustrating an exemplary wireless audio system 100 in accordance with an embodiment. Wireless audio system 100 may include an audio source 102, a primary wireless headphone 104, and a secondary wireless headphone 106. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound.

In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset according to some embodiments. It is understood that although in FIG. 1, wireless audio system 100 includes both audio source 102 and the pair of primary and secondary wireless headphones 104 and 106, in some embodiments, wireless audio system 100 may include only primary wireless headphone 104 and secondary wireless headphone 106.

As shown in FIG. 1, bidirectional communications may be established between audio source 102 and primary wireless headphone 104 and between audio source 102 and secondary wireless headphone 106. In some embodiments, a normal communication link may be established between audio source 102 and primary wireless headphone 104 using a short-range wireless communication (e.g., the BLUETOOTH communication or WiFi communication). That is, primary wireless headphone 104 may work in the normal mode. In the normal mode, primary wireless headphone 104 may receive audio information (e.g., in data packets) transmitted by a carrier wave from audio source 102 via the normal communication link.

In some embodiments, audio information may be a stream of audio stereo information in the form of compressed or uncompressed stereo samples for first and second audio channels, such as left-channel audio information and right-channel audio information or the like.

In some embodiments, the normal communication link may be bidirectional such that primary wireless headphone 104 may transmit messages back to audio source 102 in response to the reception of the audio information from audio source 102 (e.g., when primary wireless headphone 104 and secondary wireless headphone 106 switch roles). As described below in detail, when the role switched, primary wireless headphone 104 may transmit an acknowledgment messages (ACK) or a negative acknowledgment (NACK) messages to audio source 102 in response to the reception of the audio information from audio source 102.

In some embodiments, the short-range wireless communication between audio source 102 and primary wireless headphone 104 is a unidirectional communication link in which primary wireless headphone 104 receives the audio information from audio source 102, but does not transmit data (e.g., ACK/NACK messages) back to audio source 102.

In some embodiments, a snoop communication link may be established between audio source 102 and secondary wireless headphone 106 using the same short-range wireless communication between audio source 102 and primary wireless headphone 104 (e.g., the BLUETOOTH or WiFi). That is, secondary wireless headphone 106 may work in the snoop mode in which the connection with secondary wireless headphone 106 may not be known by audio source 102. In the snoop mode, secondary wireless headphone 106 may snoop (also known as "listen" or "eavesdrop") the communications between audio source 102 and primary wireless headphone 104 on the normal communication link. By snooping the communications between audio source 102 and primary wireless headphone 104, secondary wireless headphone 106 may also receive the audio information (e.g., in data packets) transmitted by the carrier wave from audio source 102 via the snoop communication link.

The snoop communication link may be bidirectional such that secondary wireless headphone 106 may transmit messages back to audio source 102 in response to the reception of the audio information from audio source 102. As described below in detail, the messages transmitted by secondary wireless headphone 106 may include, for example, ACK messages and NACK messages.

In some embodiments, audio information may be transmitted by audio source 102 according to the BLUETOOTH protocol at the working radio frequency (RF) band between 2,402 MHz and 2,480 MHz or between 2,400 MHz and 2,483.5 MHz (referred to herein as "2.4 GHz"). BLUETOOTH is a wireless technology standard for exchanging data over short distances, and the BLUETOOTH protocol is one example of short-range wireless communication protocols. In one example, audio source 102 may apply the advanced audio distribution profile (A2DP) of the BLUETOOTH protocol for transmitting the audio information. For example, based on the A2DP, a BLUETOOTH audio streaming of music or voice may be streamed from audio source 102 to primary and secondary wireless headphones 104 and 106 over BLUETOOTH connections. In some other embodiments, other amended BLUETOOTH protocols (e.g., Low Energy (BLE), BLE audio, BLUETOOTH 5.2, etc.) may also be used for audio information transmission.

In some embodiments, audio information may be transmitted by audio source 102 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocol. It is understood that the transmission of the audio information by audio source 102 may be using any other suitable short-range wireless communication besides BLUETOOTH and WiFi.

As shown in FIG. 1, to enable secondary wireless headphone 106 work in the snoop mode, primary wireless headphone 104 may transmit, to secondary wireless headphone 106, communication parameters associated with the normal communication link between audio source 102 and primary wireless headphone 104. The communication parameters may include, but are not limited to, the address of audio source 102 (e.g., the IP address or media access control (MAC) address) and the encryption parameters between audio source 102 and primary wireless headphone 104. The transmission of the communication parameters may be carried on by a short-range wireless communication that is the same type as that for transmitting the audio information by audio source 102 or a different type of short-range wireless communication. For example, the short-range wireless communication may be BLUETOOTH communication, amended BLUETOOTH communication or WiFi communication. In some embodiments, the transmission of the communication parameters may be at a frequency lower than the frequency used for transmitting the audio information by audio source 102 (e.g., 2.4 GHz). For example, near-field magnetic induction (NFMI) communication may be used for transmitting the communication parameters. NFMI communication is a short-range wireless communication by coupling a tight, low-power, non-propagating magnetic field between devices. NFMI communication can contain transmission energy within the localized magnetic field, which does not radiate into free space. In some embodiments, the carrier wave frequency for NFMI communication is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz).

Upon receiving the communication parameters from primary wireless headphone 104, secondary wireless headphone 106 can establish the snoop communication link with audio source 102 based on the communication parameters. For example, secondary wireless headphone 106 may pretend to be primary wireless headphone 104 so that audio source 102 does not recognize secondary wireless headphone 106 as a newly-connected device and thus, will not disconnect and reconnect with secondary wireless headphone 106.

In some embodiments, when the audio information is wireless transmitted, the data packet (e.g., the payload of the data packet) is processed (e.g., modulated) on a bit level based on the communication protocol being used. For example, FIG. 8 illustrates an exemplary process 800 of handling data payload process using BLUETOOTH physical layer, in accordance with an embodiment.

Figure 8:
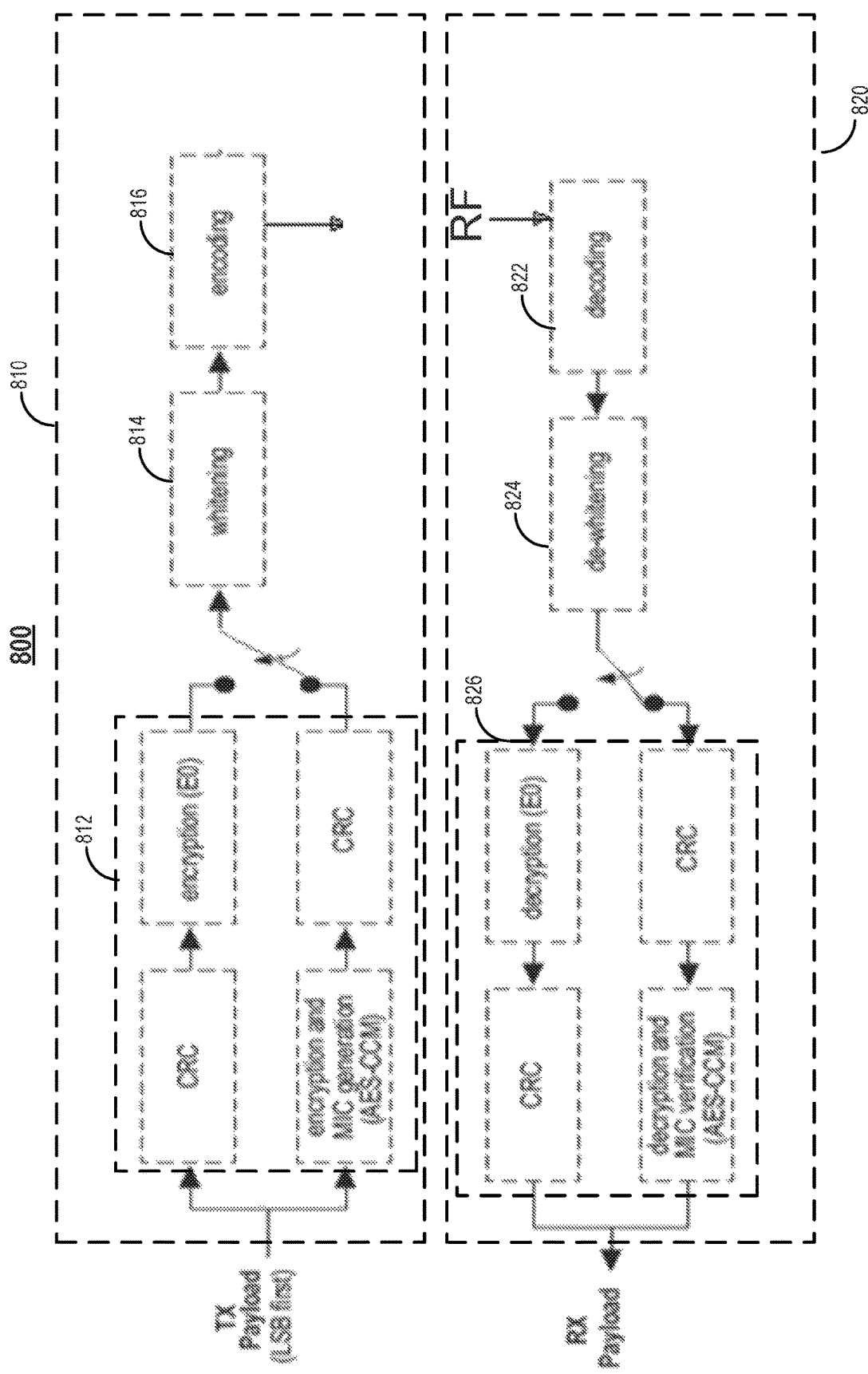
FIG. 8 illustrates an exemplary data payload processing through BLUETOOTH physical layer, in accordance with an embodiment.

As illustrated in FIG. 8, a physical layer module 810 of a transmitter (e.g., audio source 102) may modulate the payload of the data packet by encrypting, whitening and encoding the payload of the data packet using an encryption module 812, a whitening module 814 and an encoding module 816. In some embodiments, encryption module 812 may be configured to encrypt the payload of the data packet. For example, encryption module 812 may include a CRC module and an encryption and MIC generation module. The CRC module and the encryption and MIC generation module can be applied in different orders. For example, when the CRC module applies EO encryption, the entire payload shall be encrypted. On the other hand, when the encryption and MIC generation module applies AES-CCM encryption, only the payload body and MIC shall be encrypted. The payload header and CRC shall not be encrypted. In some embodiments, whitening module 814 may be configured to whiten the payload (e.g., scrambling the payload using whitening words), and encoding module 816 may be configured to encode the payload to generate the data packet that would be transmitted to a receiver using the BLUETOOTH protocol. In some embodiments, even if being modulated based on the same audio information, because of the modulation process (e.g., the whitening process), the modulated payload of each data packet may be different.

Similarly, a physical layer module 820 of a receiver (e.g., primary wireless headphone 104 or secondary wireless headphone 106) may receive the data packet using an RF module, and may demodulate/decode the payload of the received data packet by decoding, de-whitening and decrypting the data packet using a decoding module 822, a de-whitening module 824 and a decryption module 826. Decoding module 822, de-whitening module 824, and decryption module 826 may apply reverse operations corresponding to the operations played encoding module 816, whitening module 814, and encryption module 812 when demodulating the payload of the data packet.

In some embodiments, in response to successfully receiving the audio information (e.g., a BLUETOOTH audio data packet) from audio source 102, primary wireless headphone 104 may be configured to generate an error correcting code (ECC) based on the audio information (e.g., by coding the payload of the BLUETOOTH audio data packet). Primary wireless headphone 104 then may transmit an error correcting message (ECC MSG) including the ECC to secondary wireless headphone 106. The ECC may include, but not limited to, Reed-Solomon (RS) code, Bose-Chaudhuri-Hocquenghem (BCH) code, etc. In case secondary wireless headphone 106 does not successfully receive the audio information from audio source 102 (e.g., error found in the payload of a BLUETOOTH audio data packet), the ECC contained in the error correcting message from primary wireless headphone 104 may be used by secondary wireless headphone 106 to correct the audio information (e.g., the error found in the payload of the BLUETOOTH audio data packet). Also, the transmission of an error correcting message with an ECC can serve as an ACK message indicative of the successful reception of the audio information by primary wireless headphone 104. Thus, when secondary wireless headphone 106 successfully receives the audio information from audio source 102 based on the ECC from primary wireless headphone 104, secondary wireless headphone 106 may transmit an ACK message to audio source 102 indicative of the successful receptions of the audio information by both primary and secondary wireless headphones 104 and 106.

It is understood that secondary wireless headphone 106 may successfully receive the audio information from audio source 102 based on the ECC, either when secondary wireless headphone 106 successfully receives the audio information from audio source 102 without error at the first place (i.e., without the need of correction using the ECC) or when secondary wireless headphone 106 successfully corrects the audio information from audio source 102 based on the ECC. In either case, secondary wireless headphone 106 is considered as "successfully receiving the audio information from audio source 102 based on the ECC."

The transmission of the error correcting message may be carried on by a short-range wireless communication that is the same type as that for transmitting the audio information by audio source 102 or a different type of short-range wireless communication. For example, the short-range wireless communication for transmitting the error correcting message may be BLUETOOTH communication, amended BLUETOOTH communication or WiFi communication. The WiFi communication may be based on any suitable standards, such as IEEE 802.11b, 802.11d, 802.11g, etc. In some embodiments, the transmission of the communication parameters may be at a frequency lower than the frequency used for transmitting the audio information by audio source 102 (e.g., 2.4 GHz). For example, NFMI communication may be used for transmitting the error correcting message. In some embodiments, the carrier wave frequency for NFMI communication is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz). In some embodiments in which WiFi communication or NFMI communication is used between primary wireless headphone 104 and secondary wireless headphone 106, instead of transmitting the error correcting messages, primary wireless headphone 104 transmits the entire audio information (e.g., the entire BLUETOOTH audio data packets) to secondary wireless headphone 106.

In some embodiments, both primary wireless headphone 104 and secondary wireless headphone 106 may be synchronized with audio source 102 for data transmission. For example, primary wireless headphone 104 and/or secondary wireless headphone 106 may receive the data packet and determine a timing error and/or a carrier synchronization error (e.g., the carrier frequency and phase differences) between primary wireless headphone 104 and/or secondary wireless headphone 106 and the audio source 102. For example, the determined timing error and/or determined the carrier synchronization error may be used to calibrate an oscillator of primary wireless headphone 104 and/or secondary wireless headphone 106, and thus synchronize the local clock of primary wireless headphone 104 and/or secondary wireless headphone 106 with the remote clock of audio source 102.

In some embodiments, primary wireless headphone 104 and secondary wireless headphone 106 may not communicate directly except for transmitting the communication parameters and error correction messages as described above. Primary wireless headphone 104 and secondary wireless headphone 106 may be synchronized via their communications with audio source 102. The local clocks of each of primary wireless headphone 104 and secondary wireless headphone 106 may be synchronized with the remote clock of audio source 102 and thus, are synchronized with one another. By indirectly synchronizing primary wireless headphone 104 and secondary wireless headphone 106 via audio source 102, the sound can be simultaneously played by both primary wireless headphone 104 and secondary wireless headphone 106.

Figure 2:
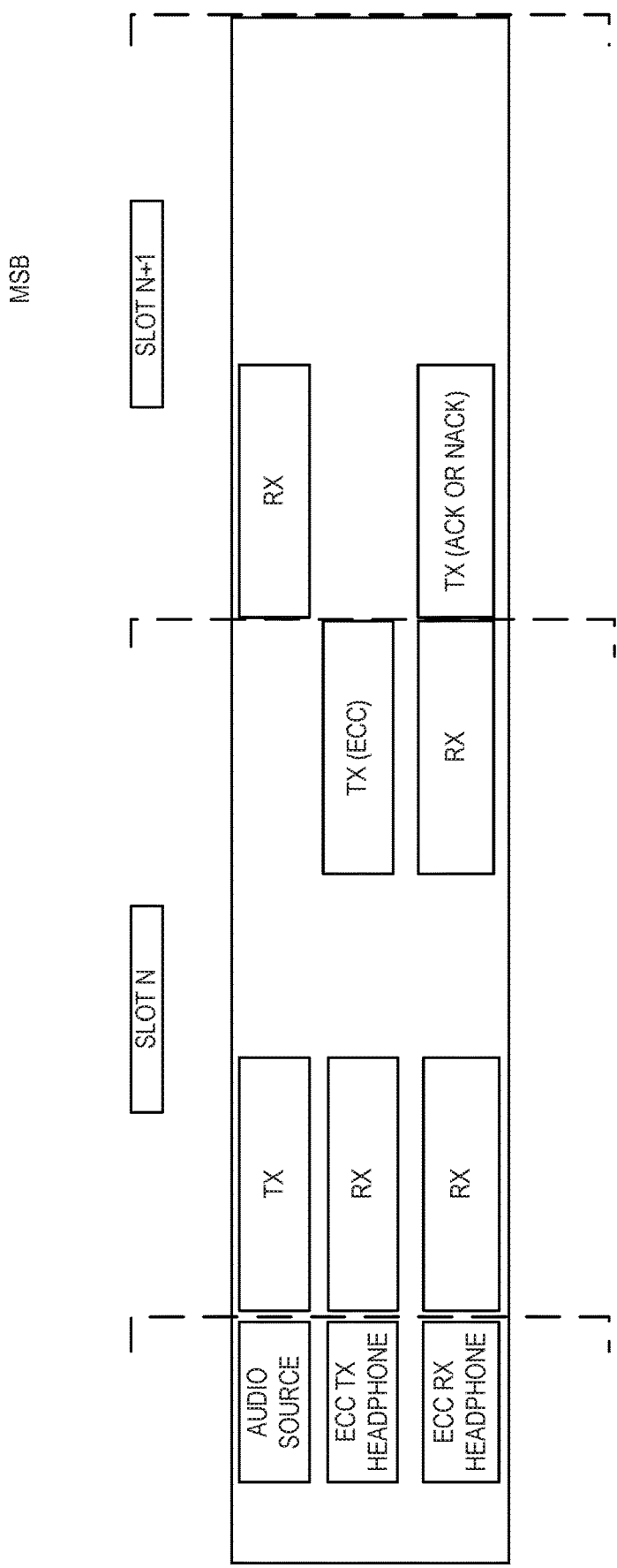
FIG. 2 is a timing diagram of the exemplary wireless audio system in accordance with an embodiment.

FIG. 2 is a timing diagram of the exemplary wireless audio system in accordance with various embodiments. As described above, error correcting messages may be transmitted from an ECC transmitting wireless headphone to an ECC receiving wireless headphone. As described above, in some embodiments, each of the time slots (e.g., N and N+1) has the same duration, for example, 625 μs for BLUETOOTH communication. As shown in FIG. 2, in a first time slot (N), the audio source transmits an audio data packet (e.g., a BLUETOOTH audio data packet), and each of the ECC transmitting and receiving wireless headphones receives the audio data packet. In the same time slot (N), the ECC transmitting wireless headphone transmits an error correcting message including an ECC on condition that the ECC transmitting headphone successfully receives the audio data packet in the time slot (N). In the same time slot (N), the ECC receiving wireless headphone receives the error correcting message from the ECC transmitting wireless headphone.

In a second time slot (N+1) immediately subsequent to the first time slot (N), the ECC receiving wireless headphone may transmit an ACK message or a NACK message to the audio source depending on whether it successfully receives the audio data packet based on the error correcting message in the first time slot (N). In a first situation, if in the first time slot (N), the ECC receiving wireless headphone receives the error correcting message including the ECC from the ECC transmitting wireless headphone and corrects the error in the audio data packet based on the ECC (i.e., successfully receiving the audio data packet after the correction), then in the second time slot (N+1), the ECC receiving wireless headphone transmits an ACK message to the audio source. In a second situation, if in the first time slot (N), the ECC receiving wireless headphone receives the error correcting message and detects that the ECC transmitting wireless headphone receives the audio data packet from the audio source correctly (e.g., detecting bits such as the head or the synchronization code of the ECC, indicating the ECC transmitting wireless headphone receiving the audio data packet from the audio source correctly) and does not find any error in the audio data packet (i.e., successfully receiving the audio data packet without the correction from the audio source), then in the second time slot (N+1), the ECC receiving wireless headphone transmits an ACK message to the audio source as well. In a third situation, if in the first time slot (N), the ECC receiving headphone receives the error correcting message including the ECC from the ECC transmitting wireless headphone and fails to correct the error in the audio data packet using the ECC (i.e., not successfully receiving the audio data packet), then in the second time slot (N+1), the ECC receiving wireless headphone transmits a NACK message to the audio source. Upon receiving the NACK from the ECC receiving wireless headphone, the audio source may re-transmit the audio information for predetermined times or till receiving an ACK from the ECC receiving wireless headphone.

Figure 3:
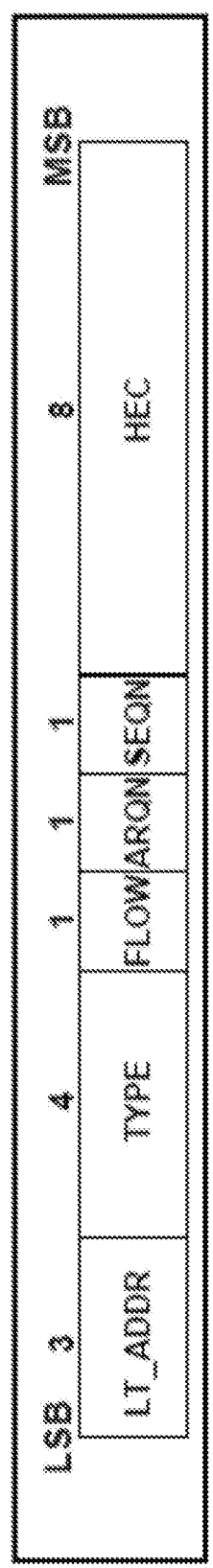
FIG. 3 is a depiction of an exemplary header of an ACK message in accordance with an embodiment.

In some embodiments, the audio source can determine if the reception message is an ACK or a NACK based on the header of the message. For example, FIG. 3 is a depiction of an exemplary header of an ACK message in accordance with an embodiment. The header includes an acknowledge indication bit (ARQN) indicative of whether the packet is an ACK message or a NACK message. The packet is an ACK message if ARQN is 1, and the packet is a NACK message if ARQN is 0.

In some embodiments, when the audio source re-transmits the data packet upon receiving the NACK from the ECC receiving wireless headphone, the ECC transmitting wireless headphone may continue generating ECC messages based on each re-transmission. In some embodiments, each subsequent ECC message may include different ECC codes. The ECC transmitting wireless headphone may still transmit each ECC message to the ECC receiving headphone for data packet correction. In some embodiments, if the subsequent re-transmission (e.g., after the ECC transmitting successfully receives the data packets in the first transmission) is unsuccessful, the ECC transmitting wireless headphone may decide if the data packets are received through re-transmission (e.g., determined based on the header of the data packets). If so, the ECC transmitting wireless headphone can generate ECC message(s) only based on the first transmission of the data packet.

With more ECC messages including the ECC, the ECC receiving wireless headphone may correct more audio information with errors, thereby reducing the numbers of re-transmissions and improving the system reliability. In some embodiments, the headphone with better signal quality is used as the ECC receiving wireless headphone. That is, the signal quality of the ECC receiving wireless headphone may be better than the signal quality of the ECC transmitting wireless headphone. As a result, the likelihood that audio source 102 can successfully receive the ACK and/or NACK messages from the ECC receiving wireless headphone may be increased.

In some embodiments, when implementing the features related to ECC disclosed herein, the roles of primary and secondary wireless headphones can be switched. In other words, either primary or secondary wireless headphone 104 or 106 can be the party generating and transmitting the ECC (ECC transmitting wireless headphone), and either primary or secondary wireless headphone 104 or 106 can be the party utilizing the ECC for correcting the audio information and transmitting the ACK message to audio source 102 (ECC receiving wireless headphone). In some embodiments, the ECC transmitting wireless headphone and the ECC receiving wireless headphone can be dynamically switched based on the signal quality of each of the ECC transmitting wireless headphone and ECC receiving wireless headphone. In some embodiments, the headphone with better signal quality is used as ECC transmitting wireless headphone. That is, the signal quality of the ECC transmitting wireless headphone may be better than the signal quality of the ECC receiving wireless headphone. As a result, the likelihood that the ECC transmitting wireless headphone can successfully receive the audio information from audio source 102 may be increased.

Figure 4A:
FIGS. 4A and 4B are depictions of exemplary BLUETOOTH audio data packets in accordance with an embodiment.
Figure 4B:
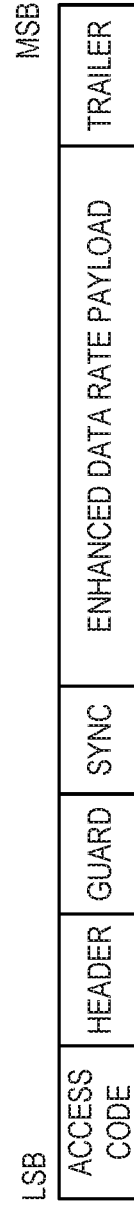

In some embodiments, when transmitting the audio information from audio source 102 to primary wireless headphone 104 and secondary wireless headphone 106, the audio information may be encoded in data packets). For example, FIGS. 4A and 4B are depictions of exemplary BLUETOOTH audio data packets in accordance with an embodiment. Both BLUETOOTH audio data packets in FIGS. 4A and 4B include an access code, a header, and a payload in which the actual audio information is coded. As described above, FIG. 3 illustrates an example of a header in a BLUETOOTH audio data packet. FIG. 4B illustrates an enhanced data rate BLUETOOTH audio data packet, which further includes guard, synchronization, and trailer fields. The payload of the enhanced data rate BLUETOOTH audio data packet may be transmitted at a higher symbol rate than the standard BLUETOOTH symbol rate by using different a modulation technique (e.g., DPSK) than the modulation technique sued in the header (e.g., GFSK). As described above, the ECC can be coded based on the actual audio information in the payload of a BLUETOOTH audio data packet using RS code, BCH code, etc.

In some embodiments, both primary wireless headphone 104 and the secondary wireless headphone 106 can demodulate the received data packets based on demodulating payload estimation(s) (e.g., by making soft decision(s) instead of hard decision(s) to the data packets), and consolidating the payload estimations if received unsuccessfully (e.g., fail to pass the correction check). For example, FIG. 5 is a detailed block diagram of an exemplary wireless headphone 500 (e.g., primary wireless headphone 104 or the secondary wireless headphone 106), in accordance with an embodiment.

Figure 6:
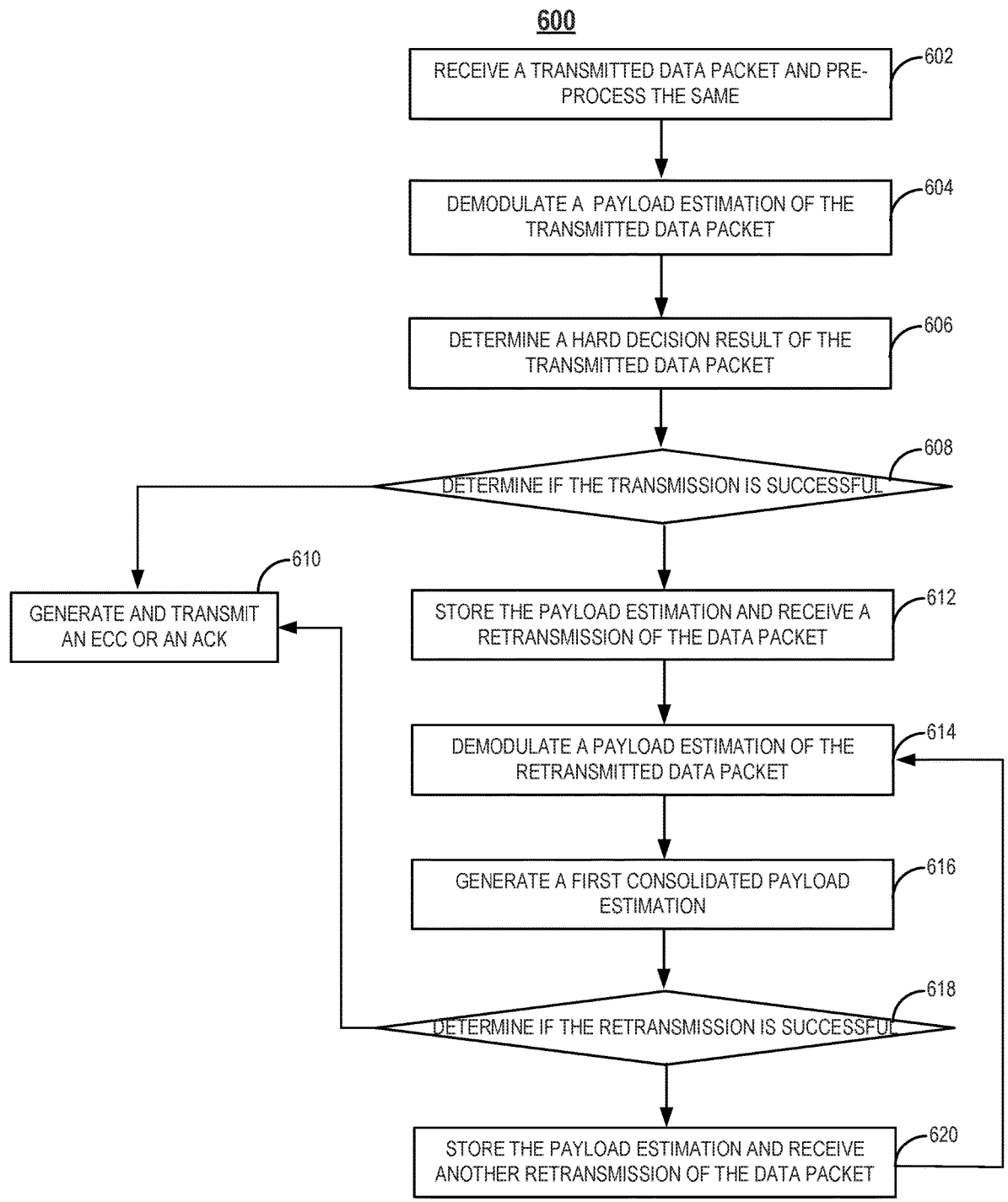
FIG. 6 is a flow chart illustrating an exemplary method for wireless communication in accordance with an embodiment.

FIG. 6 is a flow chart illustrating an exemplary method 600 for wireless communication in accordance with an embodiment. Method 600 can be performed by processing logic that can comprise hardware (e.g., circuitry, dedicated logic, programmable logic, microcode, etc.), software (e.g., instructions executed on a processing device), or a combination thereof. In some embodiments, instructions for each step of method 600 may be stored in a memory, and when read and executed by a processor of wireless operatively coupled to the memory, wireless headphone 500 would perform method 600 accordingly. It is to be appreciated that not all operations may be needed to perform the disclosure provided herein. Further, some of the operations may be performed simultaneously, or in a different order than shown in FIG. 6, as will be understood by a person of ordinary skill in the art.

Method 600 shall be described with reference to FIG. 5. However, method 600 is not limited to that exemplary embodiment. In method 600, the data packets received (e.g., through first transmission and subsequent re-transmission(s)) may be demodulated based on soft decision decoding (e.g., demodulating payload estimations) and each unsuccessfully transmitted data packet would be used and considered for generating the correct payload by being consolidated based on method 600 disclosed herein.

Figure 5:
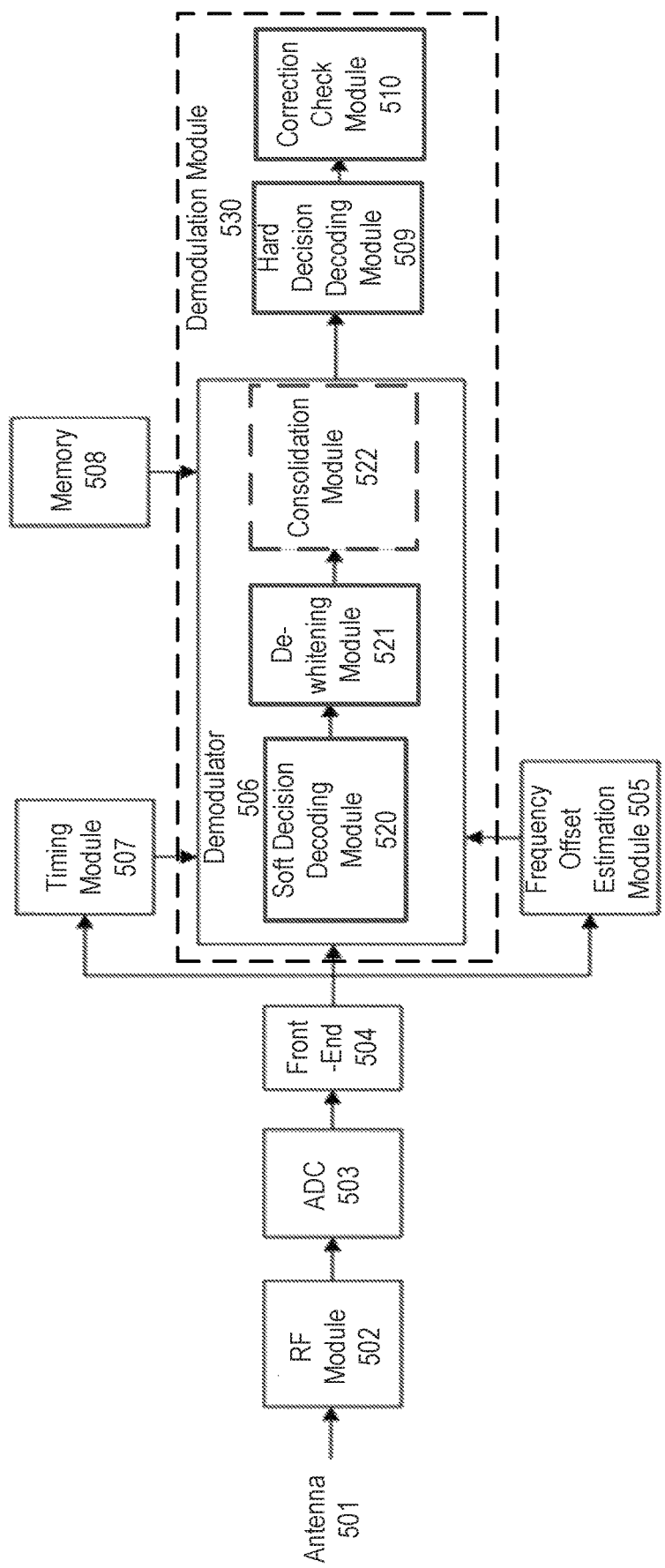
FIG. 5 is a detailed block diagram of an exemplary wireless headphone, in accordance with an embodiment.

As illustrated in FIG. 5, in this example, wireless headphone 500 includes an antenna 501, a Radio Frequency (RF) module 502, an analog-to-digital (A/D) converter 503, a digital front-end 504, a frequency offset estimation module 505, a demodulation module 530, a timing module 507 and a memory 508.

In some embodiments, demodulation module 530 may include hardware(s) specifically designed for soft demodulation, such as a digital signal processor (DSP), a processor or any suitable hardware suitable for performing the functions disclosed herein. In some other embodiments, demodulation module 530 may include a general-purpose processor, suitable for other purposes in addition to soft demodulation. In some embodiments, demodulation module 530 may include a demodulator 506, a hard decision decoding module 509 and a correction check module 510.

Starting from step 602, after establishing a wireless communication link (e.g., BLUETOOTH communication link) with the audio source through a physical layer of wireless headphone 500 (not shown), antenna 501 may receive the data packet from an audio source (e.g., audio source 102) and pre-process the data packet before being demodulated by demodulation module 506. In some embodiments, antenna 501 may include an array of conductors for transmitting and receiving radio waves at one or more RF bands corresponding to RF module 502. For example, antenna 501 may receive wireless signals including audio information, and RF module 502 may be configured to demodulate the audio information from the carrier wave.

A/D converter 503 may be operatively coupled to RF module 502 and may be configured to convert an audio signal from an analog signal to a digital signal. The digital audio signal may be provided to digital front-end 504 that is operatively coupled to A/D converter 503. The A/D conversion may be performed by A/D converter 503 based on a predetermined A/D sampling rate.

Digital front-end 504 may be operatively coupled to A/D converter 503 and may be configured to receive the converted data, such as digital data representing the audio information (e.g., the original data) described above. Digital front-end 504 may perform filtering, downsampling, and Digital Down Conversion (DDC), etc. to process the data in digital form. The processed data may be transmitted to demodulator 506 for demodulation.

In some embodiments, frequency offset estimation module 505 and timing module 507 may be configured to generate a local time and synchronize the local time with a remote time associated with the audio source. For example, timing module 507 may include a crystal or digital oscillator configured to generate the local time for wireless headphone 500. Frequency offset estimation module 505 may include a counter for determining a carrier synchronization error of the local clock. The frequency of the local time can be calibrated by frequency offset estimation module 505 based on the carrier synchronization error. Demodulation module 530 may demodulate the processed data packet based on the calibrated local clock (e.g., use the calibrated local time as the system time for soft demodulating the processed data packet).

In step 604, demodulator 506 may demodulate the first payload estimation of the transmitted data packet based on making a soft decision (e.g., a payload estimation with the whitening) of the transmitted data packet using the pre-processed data packet received from digital front-end 504. In some embodiments, demodulator 506 may include a soft decision decoding module 520, a de-whitening module 521, and a consolidation module 522 for soft demodulating the data packets. For example, when a data packet is first transmitted (i.e., received by wireless headphone 500 for the first time), after being pre-processed and received by demodulation module 506, soft decision decoding module 520 may determine a soft decision result (disclose in detail below) of the received data packet (e.g., a first payload estimation without de-whitening).

Figure 7:
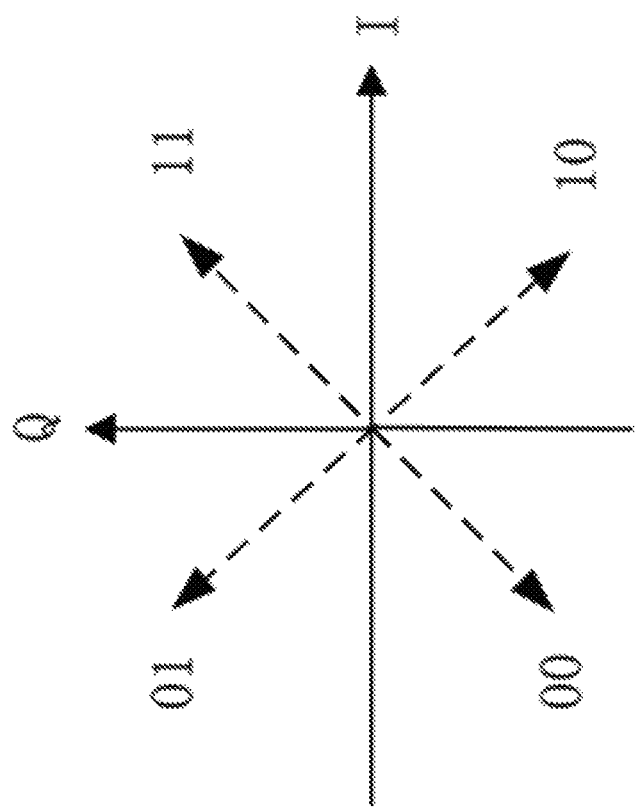
FIG. 7 illustrates an exemplary soft decision making in accordance with an embodiment.

For example, FIG. 7 illustrates an exemplary soft decision making in accordance with an embodiment. In some embodiments, the data packet used for making the soft decision (e.g., making the payload estimation) can be the data packet before the hard decision decoding. For example, when the data packet is transmitted based on BLUETOOTH protocol (e.g., modulated based on modulation techniques such as DQPSK or D8PSK), the data packet used for making the soft decision may be the data packet before being de-mapped. For one specific example, when the data is demodulated based on QPSK, as illustrated in FIG. 7, a data point before the being de-mapped may include two most significant bits I and Q. I and Q may be discretized with a number of quantization levels and may be used for generating $I_1$ and $Q_1$ as an output of the soft decision making. For example, a data point (0.24863, 6.78048) may be quantitated to be (0.2, 6.8). In some embodiments, $I_1$ can be determined according to $abs(I_1+a)-abs(I_1-a)$, where a is an amplitude value for significant bit I. Similarly, $Q_1$ can be determined according to $abs(Q1+b)-abs(Q1-b)$ where b is an amplitude value for significant bit Q. In some embodiments, a and b can be a smoothing of sampled amplitude values of significant bits I and Q, respectively.

In some embodiments, de-whitening module 521 may demodulate the first payload estimation of the transmitted data packet by de-whitening the result of the soft decision. In some embodiments, when data packets are transmitted over BLUETOOTH protocols, the data is whitened before being transmitted. For example, the data may be scrambled based on the last six digits of the clock (e.g., the whitening word), which is only known by the devices in communication (e.g., the audio source and wireless headphone 500). In some embodiments, de-whitening module 521 may de-whiten (i.e., remove data whitening) by determining the correct sequence of the data based on comparing the linkID or the cyclic redundancy check (CRC). It is contemplated that other suitable whitening and de-whitening methods may also be applied to the wireless communication system and method disclosed herein.

In step 606, a hard decision is made based on the transmitted data packet. In step 608, correction check module 510 determines if the transmission is successful based on the hard decision. For example, correction check module 510 may determine if the transmission is successful based on performing the CRC on the result of the hard decision, or based on a compression between the first payload estimation and the result of the hard decision.

In some embodiments, if the transmission to wireless headphone 500 is successful, in step 610, wireless headphone 500 generates and transmits an ECC or an ACK to another wireless headphone (e.g., the ECC receiving wireless headphone), or transmit an ACK to the audio source indicating the transmission is successful.

For example, if wireless headphone 500 is an ECC transmitting wireless headphone, wireless headphone 500 may generate an ECC message including an ECC code based on the transmitted data packet as disclosed in detail above, without the original data packet, and may transmit the ECC message to the ECC receiving wireless headphone. Or wireless headphone 500 may transmit an ACK to the ECC receiving wireless headphone indicating the data packet is received successfully by wireless headphone 500. As disclosed above, in some embodiments, the ECC message including the ECC code can also be used as the ACK indicating the transmission is successful.

On the other hand, if wireless headphone 500 is an ECC receiving wireless headphone, wireless headphone 500 may transmit an ACK to the audio source, and the audio source would stop transmitting the data packet (i.e., do not re-transmit the data packet corresponding to the same original data). It is contemplated that if the data packet is received successfully in the first transmission, consolidation module 522 may not be used accordingly.

In some embodiments, if the transmission is determined unsuccessful (e.g., fail to pass the correction check), in step 612, the first payload estimation may be stored in memory 508 for further processing (e.g., being consolidated with a later payload estimation), and the audio source may re-transmit the same data packet to wireless headphone 500.

In step 614, a second payload estimation of the re-transmitted data may be demodulated by soft decision decoding module 520 and de-whitening module 521. In step 616, consolidation module 522 generates a first consolidated payload estimation. For example, consolidation module 522 may retrieve the first payload estimation from memory 508, receive the second payload estimation from de-whitening module 521 and generate the first consolidated payload estimation by consolidating the first payload estimation and the second payload estimation.

In step 618, correction check module 510 checks if the re-transmission is successful based on the first consolidated payload estimation, similar to checking if the first transmission is successful in steps 604-608. For example, consolidation module 522 may demodulate the first consolidated payload estimation, hard decision decoding module 509 may determine a hard decision of the re-transmitted data packet, and the demodulated first consolidated payload estimation may then be used for checking if the re-transmission of the data packet is successful by correction check module 510, similar to checking if the first transmission is successful in step 608.

In some embodiments, if the re-transmission is successful, method 600 moves to step 610, similar to the determination that the first transmission is successful.

In some embodiments, if the re-transmission is still unsuccessful, in step 620, the first consolidated payload estimation may be stored in memory 508 for further processing (e.g., for consolidation with another re-transmitted data packet) and antenna 501 receives another data packet (e.g., a second re-transmission) from the audio source. Upon receiving the second re-transmitted data packet, method 600 moves back to step 614. For example, a third payload estimation of the second re-transmitted data packet may be demodulated by soft decision decoding module 520 and de-whitening module 521. In some embodiments, consolidation module 522 may retrieve the first consolidated payload estimation from memory 508, receive the third payload estimation from de-whitening module 521 and consolidate the first consolidated payload estimation and the third payload estimation to generate a second consolidated payload estimation.

In some embodiments, the second consolidated payload estimation may also be demodulated by consolidation module 522, and then be used for checking if the second re-transmission of the data packet is successful. For example, consolidation module 522 may demodulate the second consolidated payload estimation, hard decision decoding module 509 may determine a hard decision of the second re-transmitted data packet, and the demodulated second consolidated payload estimation may then be used for checking if the second re-transmission of the data packet is successful by correction check module 510, similar to checking if the first transmission is successful in step 608.

It is contemplated that a third, a fourth, a fifth, etc., re-transmission may happen, and the data packet received would be consolidated with the previously consolidated payload estimation till the data packet is successfully received by wireless headphone 500, based on method 600 disclosed above. When one of the re-transmissions is successful, method 600 may go to step 610, and wireless headphone 500 would perform the same.

Comparing with conventional wireless communication methods, where the unsuccessfully transmitted data packet(s) (e.g., determined based on making hard decisions) would be discarded, by consolidating the payload estimation(s) (e.g., determined based on making soft decisions corresponding to unsuccessfully transmitted data packet(s)) to generate the correct payload estimation(s) for wireless communication, more useful information included in each transmitted data packet is preserved. This could thereby reduce the times of re-transmission and thus reduce the power consumption and improve the reliability of the wireless communication system.

In some embodiments, when consolidating the payload estimations, each payload estimation may be weighted. For example, each payload estimation to be consolidated can be weighted based on the quality of payload estimation. The payload estimation with higher quality may be assigned to a heavier weight and vice versa. For example, the quality of the payload estimation can be determined based on smoothing a square of the result of the soft decision or smoothing a square of a difference between the result of the soft decision and a result of the corresponding hard decision. In some embodiments, smoothing can be realized by taking an average, applying a low-pass filter to, applying a window function to the subjects, or other suitable methods.

In some other example, the quality of the payload estimation may be determined based on the quality of the corresponding data packet received. The corresponding data packet with higher quality may be assigned to a heavier weight and vice versa. For example, the quality of the data packet may be determined based on the signal-to-noise ratio. It is contemplated that other suitable methods for determining the quality of the payload estimation can also be applied.

In some embodiments, memory 508 may release all the previous payload(s) but for the last payload estimation for further consolidation to save the system resource and memory space. For example, after being consolidated with payload estimation of the re-transmitted data packet to generate the first consolidated payload estimation, the first payload estimation may be released from memory 508, and the first consolidated payload estimation may be stored accordingly. For another example, after being consolidated with the payload estimation of the second re-transmitted data packet to generate the second consolidated payload estimation, the first consolidated payload estimation may be released from memory 508 and the second consolidated payload estimation would be stored accordingly. Therefore, only the latest consolidated payload estimation (except for the first payload estimation) may be stored in memory 508 at each time point. This would greatly reduce the memory resource and system resources for conducting the wireless communication method disclosed herein.

In some embodiments, the wireless headphone may perform the core steps (e.g., performed by each hardware) in a pipelining manner. For example, core instructions such as receiving payload(s) (e.g., receiving transmitted and/or re-transmitted data packets), consolidating payload estimations (e.g., consolidate payload estimation of an unsuccessfully transmitted data packet with payload estimation of the re-transmitted data packets), demodulating the consolidated payload estimation, etc., are orderly processed where the instructions are overlapped during execution. For example, the instruction pipeline may receive the stored payload estimation from memory 508 while previous instruction(s) are being executed in other segments of wireless headphone 500. Thus, multiple core instructions can be executed simultaneously and therefore increase efficiency. Accordingly, the overall instruction throughput (e.g., the rate of successful message delivery) can be improved.

While the present disclosure has been described herein with reference to exemplary embodiments for exemplary fields and applications, it should be understood that the present disclosure is not limited thereto. Other embodiments and modifications thereto are possible and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A method for wireless communication, comprising:
receiving a first payload, corresponding to original data;
demodulating a first payload estimation based on making a first soft decision of the first payload;
receiving a second payload, corresponding to the original data, in response to re-transmission of the original data;
demodulating a second payload estimation based on making a second soft decision of the second payload; and
determining a first consolidated payload estimation based on consolidating the first payload estimation and the second payload estimation.

2. The method of claim 1, wherein demodulating each of the first and second payload estimations further comprises de-whitening a result of the first soft decision or the second soft decision.

3. The method of claim 2, wherein determining the first consolidated payload estimation further comprises weighting the first payload estimation and the second payload estimation based on a quality of the first payload estimation and the second payload estimation.

4. The method of claim 3, wherein the quality of the first payload estimation is determined based on at least one of:
smoothing a square of the result of the first soft decision;
smoothing a square of a difference between the result of the first soft decision and a result of a hard decision of the first payload; or
a signal-to-noise ratio of the first payload.

5. The method of claim 3, further comprising:
receiving a third payload corresponding to the original data;
demodulating a third payload estimation of the original data based on making a third soft decision of the third payload; and
determining a second consolidated payload estimation of the original data based on consolidating the third payload estimation and the first consolidated payload estimation.

6. The method of claim 5, further comprising:
releasing all three payload estimations except for the second consolidated payload estimation.

7. The method of claim 6, further comprising:
demodulating the second consolidated payload estimation, wherein receiving the first, second and third payloads, determining the first and a second consolidated payload estimations, and demodulating the first and second consolidated payload estimations are performed in a pipelining manner.

8. The method of claim 7, further comprising:
generating an Error Correcting Code (ECC) message in response to receiving each of the three payloads.

9. The method of claim 8, further comprising:
determining a correct payload based on the second consolidated payload estimation; and
transmitting to a wireless headphone the ECC message comprising an ECC without the original data.

10. A wireless headphone, comprising:
a radio frequency module configured to receive a first payload and a second payload, corresponding to original data; and a demodulation module configured to:
  demodulate a first payload estimation of the original data based on making a first soft decision of the first payload;
  demodulate a second payload estimation of the original data based on making a second soft decision of the second payload; and
  determine a first consolidated payload estimation of the original data based on consolidating the first payload estimation and the second payload estimation.

11. The wireless headphone of claim 10, wherein demodulating each of the first and second payload estimations further comprises de-whitening a result of the first soft decision or the second soft decision.

12. The wireless headphone of claim 11, wherein the demodulation module is configured to determine the first consolidated payload estimation is further configured to weight the first payload estimation and the second payload estimation based on a quality of the first payload estimation and the second payload estimation.

13. The wireless headphone of claim 12, wherein
  the quality of the first payload estimation is determined based on at least one of smoothing a square of the result of the first soft decision; smoothing a square of a difference between the result of the first soft decision and a result of a hard decision of the first payload; or a signal-to-noise ratio of the first payload.

14. The wireless headphone of claim 12, wherein the demodulation module is further configured to:
  receive a third payload corresponding to the original data;
  determine a third payload estimation of the original data based on making a third soft decision of the third payload; and
  determine a second consolidated payload estimation of the original data based on consolidating the third payload estimation and the first consolidated payload estimation.

15. The wireless headphone of claim 14, wherein the demodulation module is further configured to releasing all three payload estimations except for the second consolidated payload estimation.

16. The wireless headphone of claim 15, wherein the demodulation module is further configured to demodulate the second consolidated payload estimation; wherein to receive the first, second and third payloads, to determine the first and second consolidated payload estimations and to demodulate the first and second consolidated payload estimations are performed in a pipelining manner.

17. The wireless headphone of claim 16, wherein the demodulation module is further configured to generate an Error Correcting Code (ECC) message in response to receiving each of the three payloads.

18. The wireless headphone of claim 17, wherein the demodulation module is further configured to:
  determine a correct payload based on the second consolidated payload estimation; and
  transmit to a wireless headphone the ECC message comprising an ECC without the original data.

19. A system for wireless communication, comprising:
  a memory storing instructions; and
  a demodulation module coupled to the memory, and when the instructions are executed, cause the demodulation module configured to:
    receive a first payload and a second payload, corresponding to original data;
    demodulate a first payload estimation of the original data based on making a first soft decision of the first payload;
    demodulate a second payload estimation of the original data based on making a second soft decision of the second payload; and
    determine a first consolidated payload estimation of the original data based on consolidating the first payload estimation and the second payload estimation.

20. The of system claim 19, wherein the demodulation module is further configured to:
  receive a third payload corresponding to the original data;
  demodulate a third payload estimation of the original data based on making a third soft decision of the third payload; and
  determine a second consolidated payload estimation of the original data based on consolidating the third payload estimation and the first consolidated payload estimation.

* * * * *